July 30, 1935.  R. F. WOLFGRAM  2,009,755
GRAIN DIVIDER
Filed June 29, 1934
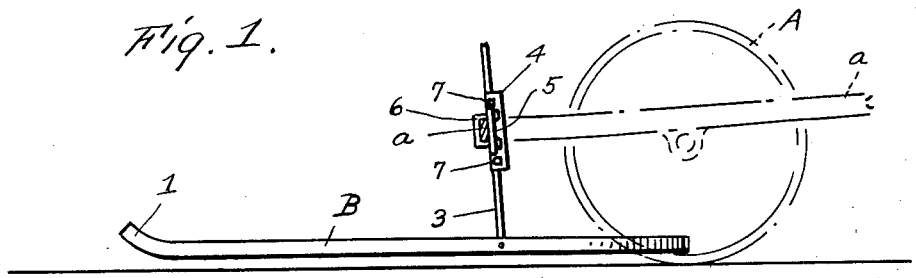
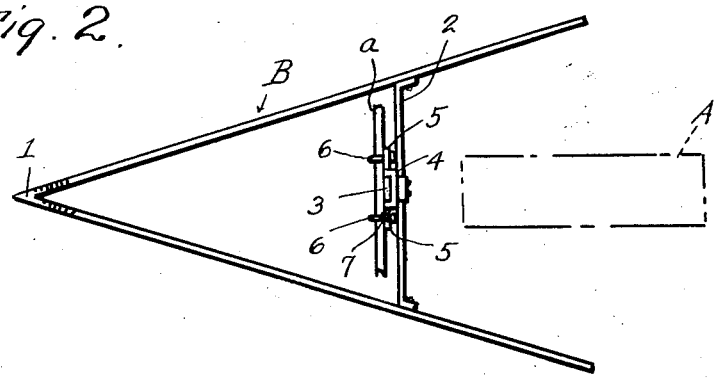
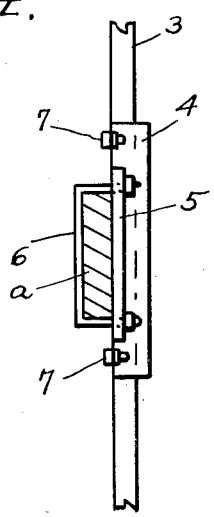
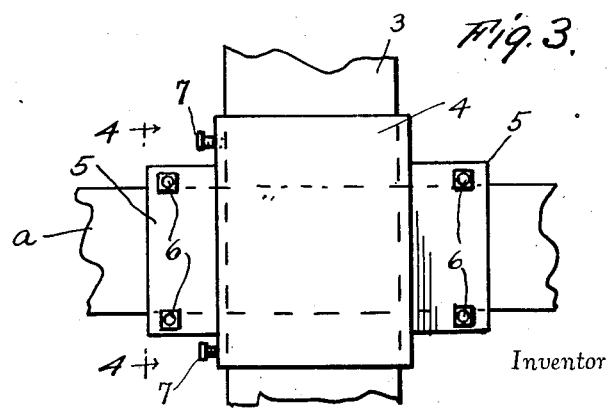
Inventor
R. Wolfgram
By Clarence A. O'Brien
Attorney Patented July 30, 1935

2,009,755

UNITED STATES PATENT OFFICE 2,009,755

GRAIN DIVIDER

Robert F. Wolfgram, Sturgeon Bay, Wis.

Application June 29, 1934, Serial No. 733,137

1 Claim. (Cl. 56—314)

This invention relates to a device for dividing grain as it is being cut by a harvester or the like, the general object of the invention being to provide a V-shaped frame detachably and adjustably supported in front of the bull wheel of the harvester so that it will divide grain and prevent grain from being crushed by the bull wheel.

This invention also consists in certain other features of construction and in the combination and arrangement of several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is an elevation part of a harvester frame showing the invention in use thereon.

Figure 2 is a top plan view of Figure 1.

Figure 3 is a rear elevational detail view showing how the standard is clamped to the frame of the harvester.

Figure 4 is a section on the line 4—4 of Figure 3.

In this drawing the letter A indicates the bull wheel of a harvester or the like and the letter *a* indicates a part of the harvester frame.

In carrying out my invention I provide a V-shaped frame B the apex of which is slightly turned upwardly as shown at 1 and a cross bar 2 connects the two members of the frame together and this cross bar has the lower end of a standard 3 connected to its central part. This standard extends upwardly and slightly forwardly as shown in Figure 1 and it is clamped to a part of the frame *a* by a channel clamping member 4 which has side parts 5 connected to a part of the frame *a* by the U-bolts 6. Set screws 7 pass through parts of the channel and engage parts of the standard to hold the same in adjusted position.

Thus it will be seen that when the device is put in place it will travel in front of the bull wheel and part the standing grain so that the bull wheel will not crush the grain. After a complete circuit of the field is made by the harvester the front thereof can be raised and the standard removed from the clamping means and the device laid aside for after a round of the field has been made there is no further use of the device.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

A grain divider for a harvester comprising a V-shaped frame, a standard carried by the frame, a channel member having outwardly extending wings at its sides, U-bolts embracing a part of the harvester frame connected to the wings for connecting the channel member in vertical position in said part of the harvester frame, said standard passing through the channel part of the channel member and set screws for clamping the standard in adjusted position in the channel member, said V-shaped frame having its apex turned upwardly and the standard sloping slightly forwardly.

ROBERT F. WOLFGRAM.